UNITED STATES PATENT OFFICE.

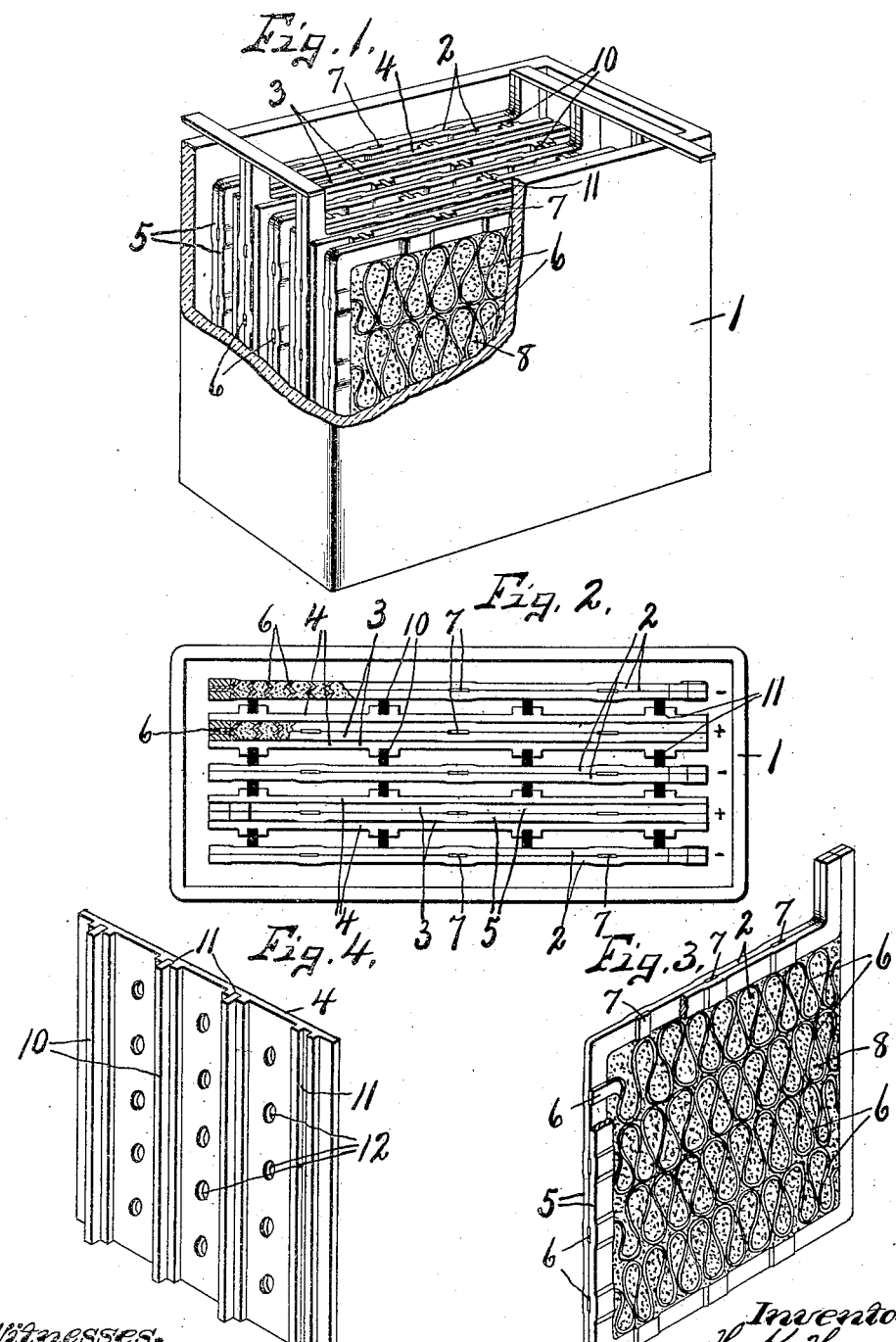

HENRY K. HESS, OF PHILADELPHIA, PENNSYLVANIA, ASSIGNOR OF ONE-HALF TO THOMAS O. PEIRCE, OF PHILADELPHIA, PENNSYLVANIA.

ELECTRIC STORAGE BATTERY.

No. 912,242.  Specification of Letters Patent.  Patented Feb. 9, 1909.

Application filed September 24, 1907. Serial No. 394,337.

*To all whom it may concern:*

Be it known that I, HENRY K. HESS, of Philadelphia, in the county of Philadelphia, in the State of Pennsylvania, have invented new and useful Improvements in Electric Storage Batteries, of which the following, taken in connection with the accompanying drawings, is a full, clear, and exact description.

This invention relates to certain improvements in electric storage batteries and refers more particularly to the general structure of the grids and to suitable confining plates which serve the double purpose of confining the active material in the grid and also of insulating the opposed electrodes one from the other.

It is well known that during the discharge and recharge of storage batteries the active material is expanded and contracted to a considerable degree thereby producing excessive strain upon and frequently disrupting or distorting the grid and also tending to disintegrate the active material and causing it to fall to the bottom of the cell thereby producing short circuits and destroying the efficiency of the battery.

My main object is to produce a comparatively light, durable and highly efficient grid which is capable of expansion and contraction to compensate for the similar action of the active material and at the same time to render such grid capable of retaining the body of active material intact. In other words, I have sought to obviate as far as practicable the liability to disintegration of both the grid and active material confined therein.

A further object is to assemble the electrodes and suitable confining plates in such manner that the confining plates serve to additionally retain the active material against disintegration so as to avoid excessive accumulations of such material in the cell which might produce short circuits or otherwise reduce the efficiency of the battery.

A still further object is to make these confining plates serve the additional purpose of insulating the adjacent electrodes one from the other and at the same time to provide them with perforations through which the electrolyte may circulate.

Other more specific objects will be brought out in the following description.

Figure 1 is a perspective view partly broken away of an electric storage battery embodying the features of my invention. Fig. 2 is a top plan partly in section of the storage battery seen in Fig. 1. Figs. 3 and 4 are perspective views respectively of one of the electrodes and one of the confining plates or insulator partitions.

In order to demonstrate the practicability of my invention I have shown a cell —1— adapted to contain a suitable electrolyte and a series of opposed electrodes —2— and —3— which are spaced apart and held in such position by intervening division or confining plates —4—. The cell —1— may be made of any suitable insulating material as rubber, porcelain or glass of sufficient size to receive the desired number of electrodes —2— and —3—. Each electrode preferably consists of a pair of lead strips —5— bent into rectangular form and receiving between them the ends of a series of comparatively thin lead strips or ribbons —6—, the intermediate portions of which are bent into the form of return loops. These strips or ribbons —6— which are made of thin metallic lead, somewhat Z-shape in cross section, as shown in Fig. 2, are arranged side by side in tiers with their intermediate portions bent into the form of loops and their ends lead burned or flatwise secured to and between the meeting faces of the marginal strips —5—, some of the loops at their junctions with the marginal strips being also lead burned or flatwise secured by suitable tie pieces —7— to the inner faces of the marginal strips —5— thereby producing a grid made up of strips of metallic lead, the transverse strips or ribbons —6— being corrugated lengthwise and transversely to receive and retain an active material —8— of litharge, or other suitable substance.

The opposed electrodes are divided and insulated one from the other by plates —4— of wood or other suitable insulating material and vertical strips —10— which are seated in grooves —11— in the plates —4—, said plates being applied to opposite faces of the alternate electrodes to further confine the active material therein, said plates being provided with a series of apertures —12— to permit the circulation of the electrolyte therethrough from one electrode to the other. The invention, however, lies more particularly in the construction of the grid forming each electrode and in the use of the confining plates in connection therewith, the electrode being composed, as described, of similar marginal strips of metallic lead bent into rectangular form and applied to each other face to face constituting a frame for receiving and supporting a series of tiers of metallic lead strips corrugated lengthwise to form a series of loops and preferably corrugated transversely and having their ends interposed between and lead burned or flatwise secured to the marginal strips of the frame so that the other tiers of lead strips or corrugated ribbons are securely fastened at their ends to the frame while the intermediate portions of the outer tiers are similarly fastened to the frame by the tie-pieces —7—, which are also lead burned to the frame and to the adjacent loops. In addition to this, the invention further consists in providing confining plates of insulating material between the electrodes, which also serve to further confine the active material within the grids and to insulate them one from the other.

What I claim is:

1. An electrode for storage batteries consisting of a substantially rectangular open frame composed of contacting lead strips secured together face to face, and a series of lead strips arranged in horizontal tiers, one above the other and having their ends interposed between the strips of the frame and their intermediate portions bent in the form of upright open loops.

2. An electrode for storage batteries consisting of a substantially rectangular open frame composed of contacting lead strips secured together face to face, and a series of lead strips arranged in horizontal tiers, one above the other and having their ends interposed between the strips of the frame and their intermediate portions bent in the form of upright open loops, the portions of the strips forming the loops being corrugated transversely.

In witness whereof I have hereunto set my hand this seventh day of September 1907.

HENRY K. HESS.

Witnesses:
 KATHERINE M. COLLINS,
 THOMAS O. PEIRCE.